United States Patent [19]

MacMaster et al.

[11] Patent Number: 4,748,803
[45] Date of Patent: Jun. 7, 1988

[54] WINDROW TURNER DISCHARGE CHUTE

[75] Inventors: Hugh J. MacMaster, New Holland; Duane R. Deardorff, Ephrata; Barry L. Getz, Leola, all of Pa.

[73] Assignee: New Holland Inc., New Holland, Pa.

[21] Appl. No.: 99,829

[22] Filed: Sep. 23, 1987

[51] Int. Cl.$^4$ .................................... A01D 78/00
[52] U.S. Cl. ...................... 56/372; 56/370; 56/366; 56/376; 56/DIG. 21
[58] Field of Search ............... 56/14.8, 16.4, 182, 56/184, 185, 189, 190, 192, 228, 365–378, 396, DIG. 21

[56] References Cited

U.S. PATENT DOCUMENTS

| | | |
|---|---|---|
| 383,317 | 5/1888 | Owen ................................ 56/189 |
| 2,391,427 | 12/1945 | Kucera. |
| 2,529,577 | 11/1950 | Schmepp et al. |
| 2,609,651 | 9/1952 | Cymara. |
| 2,629,223 | 2/1953 | Russel ............................... 56/376 |
| 2,636,335 | 4/1953 | Whitney. |
| 2,727,350 | 12/1955 | Kulluran .......................... 56/376 |
| 2,751,745 | 6/1956 | Magee .............................. 56/372 |
| 3,141,284 | 7/1964 | Reynolds .......................... 56/192 |
| 3,496,713 | 2/1970 | Reinhardt et al. |
| 3,884,022 | 5/1975 | Landolt. |

FOREIGN PATENT DOCUMENTS

| | | | |
|---|---|---|---|
| 467818 | 7/1950 | Canada ................................ 56/192 |
| 974388 | 2/1951 | France ................................. 56/364 |
| 1101716 | 10/1955 | France ................................. 56/192 |

*Primary Examiner*—John Weiss
*Attorney, Agent, or Firm*—Larry W. Miller; Frank A. Seemar; Darrell F. Marquette

[57] ABSTRACT

A discharge chute for use on a window turner having a pickup mechanism for elevating a windrow of crop material off the ground and a cross conveyor for receiving the elevated windrow and conveying the windrow laterally of the direction of travel as disclosed wherein the discharge chute is provided with an adjustable discharge edge for the floor member of the discharge chute over which the windrow must pass before being deposited on the ground. The floor member of the discharge chute is provided with an edge plate member positionally movable with respect to the floor base member, the edge plate member being fixed into a selected position relative to the floor base member by clamping bolts. The discharge edge is preferably oriented such that the inner end thereof adjacent the cross conveyor is spaced slightly forwardly of the centerline of the cross conveyor, while the outer end of the discharge edge is spaced forwardly of the inner end to define an acute angular relationship between the discharge edge and the centerline of the cross conveyor.

8 Claims, 2 Drawing Sheets 4,748,803

WINDROW TURNER DISCHARGE CHUTE

BACKGROUND OF THE INVENTION

The present invention relates generally to an apparatus for inverting and laterally displacing windrows of crop material on the ground and, more particularly, to an improved discharge chute for use in conjunction with a cross conveyor to effect an inversion of the windrow of crop material.

Many different types of apparatus for working windrows of crop material have been found in the prior art. One device utilizes a rotating tine pickup to elevate the windrow off the ground whereupon a carrousel type conveyor rotates the windrow in a circular path to tumble the windrow forwardly off the edge of the carrousel table to invert the windrow. Other devices utilize pickup mechanisms to elevate the windrow into an involute chute whereupon gravity purges the windrow back to the ground. Other devices merely elevate the windrow and shift it laterally to be dumped directly upon the ground.

Proper inversion of a windrow of crop material by a machine utilizing a rotating tine pickup mechanism to elevate the windrow of crop material onto an endless draper cross conveyor operable to convey the windrow laterally of the direction of travel would require the use of an discharge chute to receive the windrow of crop material from the cross conveyor and redirect it into a forward orientation for discharge to the ground in an inverted state. Prior art devices having the windrow of crop material pass over a discharge edge for discharge to the ground orient the discharge edge generally perpendicular to the direction of travel. This particular orientation of the discharge edge for a discharge chute used in conjunction with a draper cross conveyor results in a malformed windrow slumped to one side with the damp side of the windrow wrapped around the slumped portion of the discharged windrow and does not accomplish a complete inversion of the windrow. This malformed discharged windrow resulting from this particular orientation of the discharge edge restricts air flow through the windrow, thereby increasing the drying time required for the crop material.

SUMMARY OF THE INVENTION

It is an object of this invention to overcome the aforementioned disadvantages of the prior art by providing a discharge chute having a positionally adjustable discharge edge over which the windrow of crop material must pass to be discharged to the ground.

It is another object of this invention to orient the discharge edge of the discharge chute to accomplish a complete inversion of the windrow being discharged therefrom.

It is a feature of this invention that the floor of the discharge chute is provided with an edge plate member positionally adjustable thereto and defining a discharge edge that can be positionally varied with respect to the cross conveyor.

It is an advantage of this invention that the discharge edge can be positioned to correspond to differing crop conditions and obtain a complete inversion and proper formation of the windrow being discharged therefrom to the ground.

It is another feature of this invention that the discharge edge of the discharge chute positioned laterally outwardly of the centerline of a cross conveyor is positioned at an acute angle to the centerline of the cross conveyor and oriented forwardly therefrom.

It is still another object of this invention to provide a discharge chute for a windrow turner that effects an inversion of a windrow of crop material while maintaining the basic windrow integrity and minimizing crop damage.

It is a further object of this invention to provide a discharge chute for a windrow turner which is durable in construction, inexpensive of manufacture, carefree of maintenance, facile in assemblage and simple and effective in use.

These and other objects, features and advantages are accomplished according to the instant invention by providing a discharge chute for use on a windrow turner having a pickup mechanism for elevating a windrow of crop material off the ground and a cross conveyor for receiving the elevated windrow and conveying the windrow laterally of the direction of travel wherein the discharge chute is provided with an adjustable discharge edge for the floor member of the discharge chute over which the windrow must pass before being deposited on the ground. The floor member of the discharge chute is provided with an edge plate member positionally movable with respect to the floor base member, the edge plate member being fixed into a selected position relative to the floor base member by clamping bolts. The discharge edge is preferably oriented such that the inner end thereof adjacent the cross conveyor is spaced slightly forwardly of the centerline of the cross conveyor, while the outer end of the discharge edge is spaced forwardly of the inner end to define an acute angular relationship between the discharge edge and the centerline of the cross conveyor.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
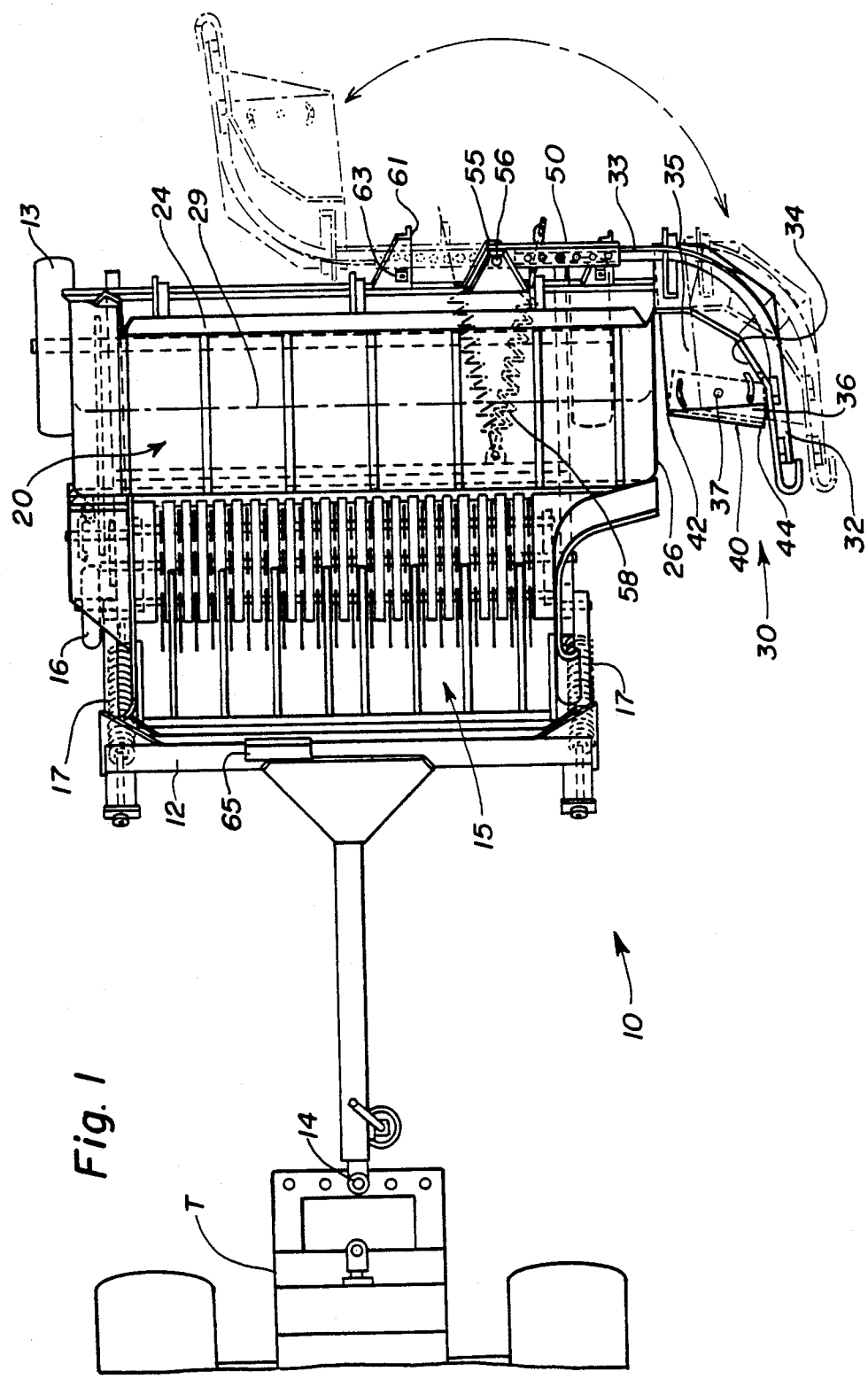
FIG. 1 is a top plan view of a windrow turner having a discharge chute positioned laterally of the draper cross conveyor, the telescopic positioning of the discharge chute being shown in phantom laterally of the cross conveyor while the pivoted transport position of the discharge chute is shown in phantom rearwardly of the cross conveyor.

Referring now to the drawings and, particularly, to FIG. 1, a top plan view of a machine for inverting and laterally displacing a windrow of crop material, commonly referred to as a windrow turner, can be seen. Any left and right references are used as a matter of convenience and are determined by standing at the rear of the machine, facing the forward end, looking in the direction of travel. The windrow turner 10 is a pull-type implement having a frame 12 provided with ground engaging wheels 13 and a hitch member 14 to permit connection thereof to a prime mover, such as a tractor T.

The windrow turner 10 is provided with a rotating tine pickup mechanism 15 operable to engage a windrow of crop material on the ground and elevate the windrow onto a rearwardly positioned cross conveyor 20. The pickup mechanism 15 is provided with at least one gauge wheel 16 adjustably positionable to vary the relative position of the pickup mechanism 15 with the ground. Flotation springs 17 minimize the weight of the pickup 15 on the gauge wheel 16 to permit the pickup 15 to more easily follow changing ground contours.

The cross conveyor 20 is shown to be of the endless draper type entrained around longtudinally extending, laterally spaced rollers 22 to form a conveying mechanism to transport the elevated windrow of crop material laterally of the direction of travel. An upright wall 24 positioned immediately rearwardly of the cross conveyor 20 prevents the windrow from passing rearwardly beyond the cross conveyor and maintains the windrow on the conveyor 20 to assist the lateral conveyance thereof.

A discharge chute 30 is positioned adjacent the left discharge end 26 of the cross conveyor 20 to receive the windrow being conveyed thereon. The discharge chute 30 is provided with a subframe 32, including a transversely extending mounting arm 33, supporting a generally upright diversion wall 34 extending generally arcuately from a transverse orientation proximate to the upright wall 24 to a forwardly extending orientation laterally opposite the discharge end 26 of the cross conveyor 20. The discharge chute 30 is also provided with a floor base member 35 contiguous to the diversion wall 34 below the cross conveyor 20 and angled downwardly from rear to front. The floor base member 35 is provided with an edge plate member 36 pivotable about an axis 37 and fixed into position relative to the floor base member 35 by clamping bolts 38. The edge plate member 36 defines a discharge edge 40 for the floor base member 35 over which the windrow of crop material is passed before being discharged to the ground.

Figure 2:
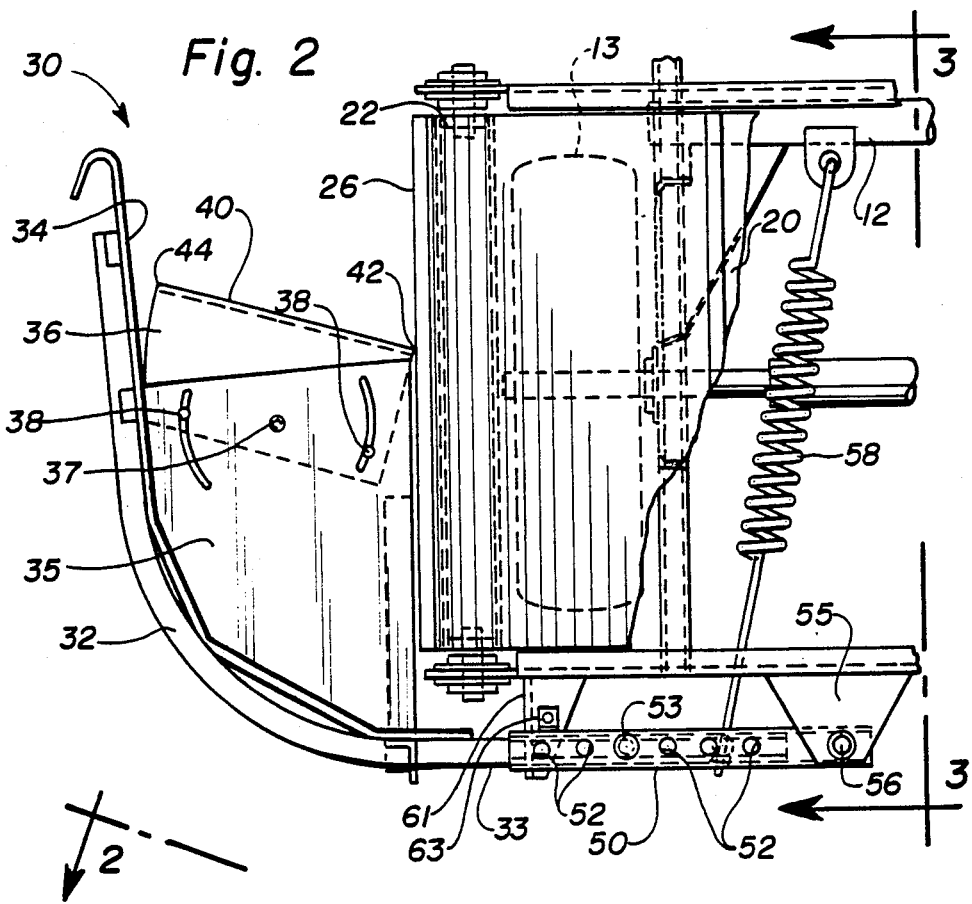
FIG. 2 is an enlarged detail plan view of a portion of the windrow turner corresponding to the discharge end of the cross conveyor and the discharge chute positioned laterally thereof in its operating position, the orientation of FIG. 2 is parallel to the inclined cross conveyor corresponding to lines 2—2 of FIG. 3, the upright wall and supporting structure rearward of the cross conveyor is not shown for purposes of clarity.
Figure 3:
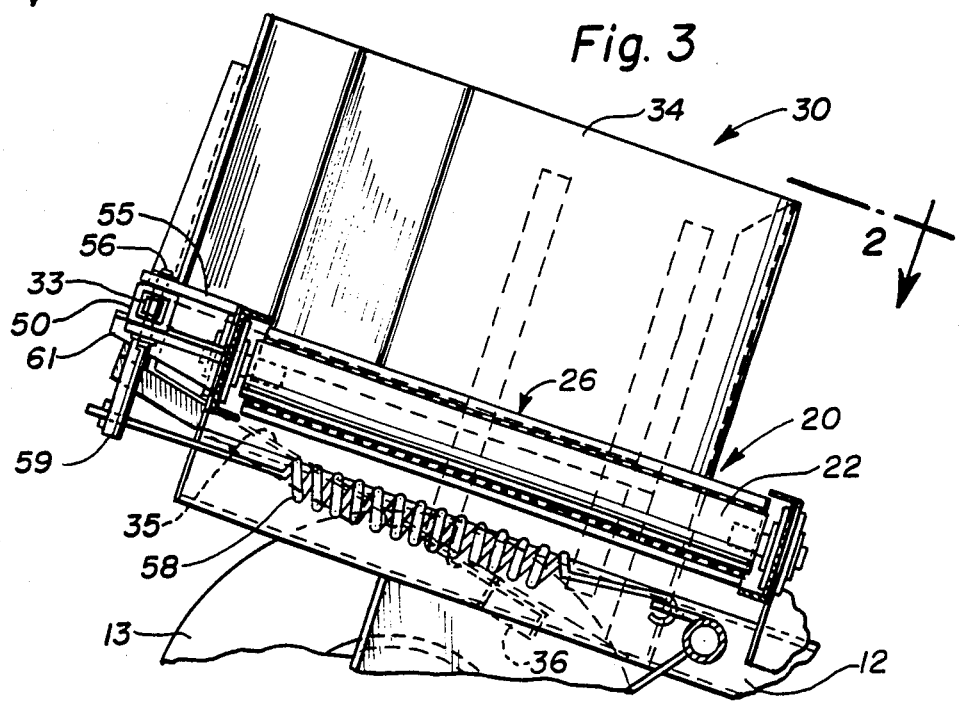
FIG. 3 is a partial vertical cross-sectional view through the cross conveyor corresponding to lines 3—3 of FIG. 2 and depicting an elevational view of the inversion chute.

Referring to FIGS. 1-3, it can be seen that the inner end 42 of the discharge edge 40 is positioned slightly forwardly of the center line 29 of the cross conveyor 20. The outer end 44 of the discharge edge 40 is positioned still forwardly of the inner end 42 resulting in an angular orientation of the discharge edge 40 with respect to the center line 29 of the cross conveyor 20. It should be noted, however, that the exact orientation of the discharge edge 40 can be varied by manipulation of the position of the edge plate member 36 relative to the floor 35 to which it is attached, thereby permitting an adjustment of the discharge edge 40 of the discharge chute 30 to correspond to differing crop conditions as desired by the operator. Nevertheless, the most complete inversion of the windrow will be obtained when the outer end 44 of the discharge edge 40 is positioned forwardly of the inner end 42.

The mounting arm 33 of the discharge chute subframe 32 is telescopically received within a mounting sleeve 50 having a plurality of apertures 52 extending therethrough. A pin or bolt 53 extending through one of the apertures 52 and a corresponding hole within the mounting arm 33 will lock the positional movement of the mounting arm 33 from within the mounting sleeve 50. The corresponding telescopic movement of the discharge chute 30 is shown in FIG. 1 in phantom. Since the orientation of the mounting sleeve 50, when the discharge chute 30 is in its operating position, is parallel to the center line 29 of the cross conveyor 20, the telescopic movement of the discharge chute 30 maintains the selected angular relationship between the orientation of the discharge edge 40 and the centerline 29 of the cross conveyor 20 throughout the entire range of telescopic movement of the discharge chute 30.

The mounting sleeve 50 is pivotally connected to a mounting bracket 55 by a pivot 56 to permit the sleeve 50 to pivotally rotate approximately 180° to move the location of the discharge chute 30 from an operating position outboard of the cross conveyor 20, as shown in solid lines in FIGS. 1 and 2, to a transport position rearwardly of the pickup 15 and cross conveyor 20 as shown in phantom in FIG. 1. An overcenter spring 58 interconnecting the frame 12 and a downwardly extending pin 59 affixed to the sleeve 50, to permit the spring 58 to clear the pivot 56, urges the mounting sleeve 50 and attached discharge chute 30 into whichever position the discharge chute 30 is placed.

A pair of support brackets 61 positioned on either side of the mounting bracket 55 and provided with a stop 63 restricts the amount of movement permitted to the mounting sleeve 50 toward the cross conveyor. One skilled in the art will readily realize that other alternatives to the stop 63 could include a pin connector or a spring clip to more positively fix the position of the mounting sleeve 50 relative to the support brackets 61. Utilization of the stop 63 or a corresponding spring clip would permit the discharge chute 30 to swing from its operating position toward its transport position upon impact thereof with an obstacle. Alternatively, the bolt 53 could be removed from the mounting sleeve 50 and mounting arm 33 to permit the mounting arm 53 to be extracted completely from the sleeve 50. A reengagement of the mounting arm 33 with a transport sleeve 65 mounted on a forward portion of the frame 12 would permit the discharge chute 30 to be carried in an alternative transport position forwardly of the pickup 15, thereby minimizing both the overall width and the overall length of the windrow turner 10.

In operation, a windrow elevated by the pickup mechanism 15 and conveyed laterally by the cross conveyor 20 into the discharge chute 30 will be engaged by the upright diversion wall 34 and redirected into a forward orientation over the floor base member 35 and across the discharge edge 40, whereupon the windrow is discharged to the ground and inverted by the forward motion of the windrow turner 10. The angular orientation of the discharge edge 40, with the outer end 44 forwardly of the inner end 42, effects a complete inversion of the windrow such that the entire damp side of the windrow which was on the bottom adjacent the ground prior to being elevated by the pickup mechanism 15 is positioned completely on top of the windrow after being discharged from the discharge chute 30. Furthermore, the shape of the discharged windrow will be substantially the same as it was originally prior to engagement with the pickup mechanism 15, except for perhaps a little fluffing, thereby permitting a proper flow of air therethrough to facilitate drying. The exact orientation of the discharge edge 40 can be manipulated by pivotally moving the edge plate member 36 relative to the floor base member 35 to which it is mounted.

The location of the inner end 42 of the discharge edge 40 just forwardly of the center line 29 of the cross conveyor 20 causes the forward edge of the windrow being conveyed laterally by the cross conveyor 20 to fall toward the ground while the rearward edge is supported by the floor base member 35 and edge plate member 36 and turned into a forward orientation by the diversion wall 34. Since a windrow of crop material comprises a mass of intertwined plants, the windrow is moved as a solitary mass by the discharge chute 30, thereby securing and facilitating the inversion of the windrow. The lateral orientation of the discharge chute 30 with respect to the discharge end 26 of the cross conveyor 20 can also be varied to accommodate windrows of different thicknesses by manipulating the telescopic movement of the mounting arm 33 from within the mounting sleeve 50. An overcenter spring 58 urges the discharge chute 30 against the stop or clip 63 to maintain the discharge chute in its operating position. Rotation of the discharge chute 30 about its pivotal mounting 56 affects a repositioning of the discharge chute 30 into its transport position which again is retained against a stop 63 by the force exerted by the overcenter spring 58.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment; however, concepts, as based upon the description may be employed in other embodiments without departing from the scope of the invention. Accordingly, the following claims are intended to protect the invention broadly, as well as in the specific form shown.

Having thus described the invention, what is claimed is:

1. In a machine for inverting and displacing windrows of crop material, said machine having a frame; a pick-up mechanism mounted on said frame to elevate a windrow of crop material lying on the ground in a first orientation along a first path with a dry side above a damp side; a cross conveyor to receive said elevated windrow of crop material and convey said elevated windrow to a discharge end aligned in a fore-and-aft direction substantially perpendicular to a transverse extending cross conveyor centerline; a discharge chute supported by said frame adjacent said discharge end and being operable to receive said elevated windrow from said cross conveyor and redirect the movement thereof into a forward direction for discharge off a forward discharge edge to the ground; and drive means for operatively powering said pickup mechanism and said cross conveyor, the improvement comprising:

said discharge edge extending from an inner end adjacent said discharge end of said cross conveyor to an outer end laterally spaced outwardly from said inner end, said outer end being forward of said inner end such that said discharge edge of said discharge chute is oriented at an acute angle to said cross conveyor centerline.

2. The machine of claim 1 wherein said inner end of said discharge edge is positioned forwardly of said cross conveyor centerline.

3. The machine of claim 2 wherein said discharge edge is defined by an end plate member adjustably mounted to a floor base member of said discharge chute to permit the angular relationship between said discharge edge and said cross conveyor centerline to be selectively varied.

4. The machine of claim 3 wherein said plate member is pivotally mounted to said discharge chute and selectively locked into position by a clamping bolt interengaging said plate member and said discharge chute.

5. In a machine for inverting and displacing windrows of crop material, said machine having a frame; a pick-up mechanism mounted on said frame to elevate a windrow of crop material lying on the ground in a first orientation along a first path with a dry side above a damp side; a cross conveyor to receive said elevated windrow of crop material and convey said elevated windrow to a discharge end aligned in a fore-and-aft direction substantially perpendicular to a transverse extending cross conveyor centerline; a discharge chute supported by said frame adjacent said discharge end and being operable to receive said elevated windrow from said cross conveyor and redirect the movement thereof into a forward direction for discharge off a forward discharge edge to the ground; and drive means for operatively powering said pickup mechanism and said cross conveyor, the improvement comprising:

said discharge edge being defined by an edge plate member adjustably mounted to a floor base member of said discharge chute to permit a selective positional adjustment of the orientation of said discharge edge relative to said cross conveyor centerline.

6. The machine of claim 5 wherein said discharge edge extends between an inner end adjacent said discharge end of said cross conveyor and an outer end spaced laterally outwardly from said inner end, said outer end being positioned forwardly of said inner end such that said discharge edge extends acutely angularly relative to said cross conveyor centerline.

7. The machine of claim 6 wherein said plate member is pivotally mounted to said discharge chute and selectively locked against said discharge chute by a clamping bolt interengaging said plate member and said discharge chute.

8. The machine of claim 7 wherein said inner end is positioned forwardly of said cross conveyor centerline.

* * * * *